(12) United States Patent
Schlenoff et al.

(10) Patent No.: US 9,196,405 B2
(45) Date of Patent: Nov. 24, 2015

(54) STABLE IRON OXIDE NANOPARTICLES AND METHOD OF PRODUCTION

(71) Applicant: Florida State University Research Foundation, Inc., Tallahassee, FL (US)

(72) Inventors: Joseph B. Schlenoff, Tallahassee, FL (US); Zaki G. Estephan, Philadelphia, PA (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 166 days.

(21) Appl. No.: 13/856,214

(22) Filed: Apr. 3, 2013

(65) Prior Publication Data

US 2013/0256583 A1 Oct. 3, 2013

Related U.S. Application Data

(60) Provisional application No. 61/619,669, filed on Apr. 3, 2012.

(51) Int. Cl.
| | | |
|---|---|---|
| *H01F 1/42* | (2006.01) | |
| *H01F 1/00* | (2006.01) | |
| *B82Y 40/00* | (2011.01) | |
| *H01F 1/44* | (2006.01) | |
| *B82Y 25/00* | (2011.01) | |

(52) U.S. Cl.
CPC ............... *H01F 1/42* (2013.01); *H01F 1/0054* (2013.01); *B82Y 25/00* (2013.01); *B82Y 40/00* (2013.01); *H01F 1/445* (2013.01); *Y10S 977/773* (2013.01); *Y10S 977/892* (2013.01); *Y10S 977/902* (2013.01)

(58) Field of Classification Search
USPC ........... 252/62.52, 62.54, 62.59, 301.16, 625; 516/9, 95, 906
See application file for complete search history.

(56) References Cited

U.S. PATENT DOCUMENTS

| | | | |
|---|---|---|---|
| 7,175,912 B2 | 2/2007 | Cui et al. | |
| 7,871,597 B2 | 1/2011 | Groman et al. | |
| 7,972,410 B1 | 7/2011 | Huber | |
| 2005/0064192 A1 | 3/2005 | Jiang et al. | |
| 2010/0166664 A1* | 7/2010 | Butts et al. | 424/9.32 |
| 2010/0278748 A1* | 11/2010 | Bonitatibus et al. | 424/9.32 |

OTHER PUBLICATIONS

Gupta et al., "Synthesis and Surface Engineering of Iron Oxide Nanoparticles for Biomedical Applications", Biomaterials, Jun. 2005, pp. 3995-4021, vol. 26.

* cited by examiner

*Primary Examiner* — Carol M Koslow
(74) *Attorney, Agent, or Firm* — Thompson Coburn LLP

(57) ABSTRACT

A method of preparing a dispersion of stabilized iron oxide nanoparticles that comprise cores and coatings on the cores, which comprise zwitterionic functional groups chemically bound to the cores, using a single solution that comprises dissolved iron ions and a zwitterion silane and/or a hydrolyzed product of the zwitterion silane.

25 Claims, 11 Drawing Sheets

STABLE IRON OXIDE NANOPARTICLES AND METHOD OF PRODUCTION

CROSS-REFERENCE TO RELATED APPLICATIONS

The present application is a non-provisional application claiming the benefit of 61/619,669, filed Apr. 3, 2012, which is incorporated herein by reference in its entirety.

FIELD OF THE INVENTION

The present invention relates to nanoparticle technology and, more particularly, nanoparticles comprising a core and a stabilizing shell, wherein the core comprises iron oxide and the shell comprises zwitterion functional groups and methods for producing the same.

BACKGROUND OF INVENTION

Interest in iron oxide nanoparticles stems from their unique properties and their applications in the different fields of science. By tuning their size, shape, or aspect ratio one can control the magnetic properties of the system. This fine tuning finds mass applications in data storage, catalysis, and in biotechnology and medicine. Detection, cell sorting, and diagnosis using iron oxide nanoparticles have been reported. However, their potential use as contrast agents in magnetic resonance imaging (MRI) or as magnetic fluids for hyperthermia treatment continues to be the driving force for their miniaturization and surface chemistry manipulation.

If a magnetic material particle is of a small enough size (e.g., in the range of about 2 to about 100 nanometers), the material's magnetic moment cannot be permanently polarized. Such a nanoparticle is said to be superparamagnetic. Superparamagnetic nanoparticles may be used to enhance contrast in MRI by reducing the T1 and T2 relaxation times of molecules such as water (see Saini et al., *Radiology*, 167, 211 (1987)).

Iron oxides are considered biocompatible and relatively non-toxic and, as a result, iron oxide nanoparticles have been synthesized and used for biomedical applications (see, e.g., D. Huber, *Small* 2005, 1, no. 5, p. 482-501, Wiley-VCH; Gupta et al., *Biomaterials*, vol. 26, p, 3995-4021 (2005)). In fact, certain iron oxide nanoparticle formulations have been approved for in vivo applications. Further, pharmacological compositions of iron oxide nanoparticles stabilized with dextran polymer were disclosed by Groman et al. (U.S. Pat. No. 7,871,597). Still further, Cui et al. (U.S. Pat. No. 7,175,912) disclose superparamagnetic nanoparticles with a noble metal shell.

For in vivo imaging it is known that nanoparticles that are small enough to pass through the filtration system of the kidney may be cleared efficiently from the bloodstream. The size required for renal filtration is known to be about less than 10 nm and more preferably less than about 6 nm. Therefore, biologically compatible nanoparticles able to pass through a sieve opening of 10 nm diameter and, preferably a 6 nm, may be advantageously employed for in vivo applications, including imaging, diagnosis and therapeutics. An adequate balance between circulation and clearance times is achieved by controlling the physicochemical properties of the nanoparticle.

Stable suspensions of nanoparticles are required for many applications but these can be difficult to produce because nanoparticles tend to agglomerate during synthesis or post-synthesis. There are, however, some applications where controlled aggregation is desired such as disclosed by Huber (U.S. Pat. No. 7,972,410). Iron oxide is a particularly troublesome material to stably suspend because its isoelectric point is around pH 7 and, thus, in physiological media it tends to lose its stabilizing surface charge.

In the case of superparamagnetic iron oxide nanoparticles (also referred to as "SPIONs"), a silica shell around the iron oxide nanoparticle has been used to stabilize the particle. The silica shell may be produced ex-situ through the well-known Stober method involving the hydrolysis of tetraethylorthosilicate (TEOS) and its subsequent condensation onto the iron oxide nanoparticle core. However, such a silica shell requires additional synthesis steps, adds to the particle size and presents additional toxicity concerns of circulating silica nanoparticles in vivo.

One of the major challenges in employing SPIONs for in vivo applications is avoiding their premature aggregation and/or uptake by natural mechanisms. For example, opsonization involves tagging the surface of a particle by certain proteins which leads to uptake of the particle by macrophages. There is a need to prevent aggregation and protein adsorption to the SPIONs, especially when they are circulating in vivo. Typically, a coating of poly(ethylene glycol) (PEG), is produced on the surface of a nanoparticle post-synthesis to impart anti-aggregation and protein resistance. Mahmoudi et al., *Advanced Drug Delivery Reviews*, vol. 63, p. 24046 (2011) summarize the many materials employed to stabilize SPION dispersions. Most of these stabilizing materials are polymers, which significantly add to the size of the particles, especially smaller particles (e.g., ≤10 nm).

In addition to having a relatively small size, having a relatively narrow particle size distribution is advantageous for SPIONs. Of the different synthetic approaches for synthesizing such SPIONs which limit agglomerations, hydrolysis of metal precursors in organic solvent is the most widely used. Such particles, however, must be transferred from organic solvents to aqueous solutions prior to in vivo injection. This requires at least one additional (sometimes cumbersome) procedure where hydrophobic ligands or stabilizers on the surface of the nanoparticles are removed and replaced with hydrophilic ligands or stabilizers.

Small molecule surfactants are often employed to stabilize suspensions. Importantly, surfactants tend to be physically adsorbed to the surface and a sufficient solution concentration must be maintained to keep them on the surface. Introduction of surfactants in vivo, however, is highly undesirable.

Additionally, binding of ligands for specific targeting of nanoparticles may also be desired for certain applications. Synthesis of aqueous iron oxide nanoparticles involves the co-precipitation of iron salts in the presence of a base. Typically, a peptization step then follows to obtain the colloidal solution. This involves the addition of certain ligands or counterions such as tetramethylammonium chloride or perchloric acid resulting in aqueous magnetic sols in the size range of 10 to 40 nm, depending on the initial concentration of $Fe^{2+}$ to $Fe^{3+}$, that are stable in basic or acidic media, respectively. These sols, however, tend to lack stability in the pH range of about 5 to about 9, thus they tend not to be suitable for biological applications without further modification.

In view of the foregoing, a need still exists for iron oxide nanoparticles having one or more of the following characteristics: stabilization without significantly adding to the size of the iron oxide nanoparticle core; stabilization with molecules that are chemically bound rather than being adhered to the iron oxide nanoparticle core; resistance to protein adsorption; long-term agglomeration resistance; sizes that are 10 nm or less; relatively narrow particle size distributions; the ability to be manufactured in a single vessel with a single reaction process without conducing post-synthesis modification or exchanging surface stabilizers.

SUMMARY OF INVENTION

One embodiment of the present invention is directed to a method of preparing a dispersion of stabilized iron oxide nanoparticles that comprise cores, which comprise at least one oxide of iron, and coatings on the cores, which comprise zwitterionic functional groups chemically bound to the cores, the method comprising precipitating at least one oxide of iron from a solution that comprises: (a) dissolved ions comprising iron; (b) a zwitterion silane, a hydrolyzed product of the zwitterion silane, or a combination thereof, wherein the zwitterion silane comprises zwitterionic functional groups; and (c) a solvent; to form the cores and the coatings and thereby the dispersion of stabilized iron oxide nanoparticles.

Another embodiment of the present invention is directed to a method of preparing a dispersion of stabilized iron oxide nanoparticles that comprise cores, which comprise at least one oxide of iron, and coatings on the cores, which comprise zwitterionic functional groups chemically bound to the cores, the method comprising adjusting the pH of a solution that comprises: (a) dissolved iron ions selected from the group consisting of $Fe^{+2}$, $Fe^{+3}$, and combinations thereof; (b) a zwitterion alkoxysilane, a hydrolyzed product of the zwitterion alkoxysilane, or a combination thereof, wherein the zwitterion alkoxysilane comprises said zwitterionic functional groups; (c) a solvent that comprises water; and (d) a molar ratio of iron ions to zwitterion alkoxysilane that is between 0.2 and 5; to precipitate the at least one oxide of iron from the solution and form the cores and the coatings and thereby the stabilized iron oxide nanoparticles; wherein the stabilized oxide of iron nanoparticles have an average size that is less than about 10 nm and the coatings have an average thickness that is less than about 5 nm; wherein the at least one oxide of iron is selected from the group consisting of $Fe_2O_3$, $Fe_3O_4$, and combinations thereof; wherein the zwitterionic functional groups are chemically bound to the cores via silane groups having the formula

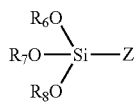

wherein $R_6$, $R_7$ and $R_8$ are alkyl groups of the formula —$C_rH_{2r+1}$ wherein r is from 1 to about 18 and Z is a zwitterion group having the formula

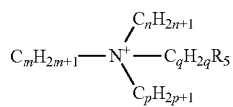

wherein m, n, p, q are 1 to about 18 and $R_5=SO_3^-$, $PO_4^-$, or $COO^-$.

DETAILED DESCRIPTION OF INVENTION

Figure 1A:
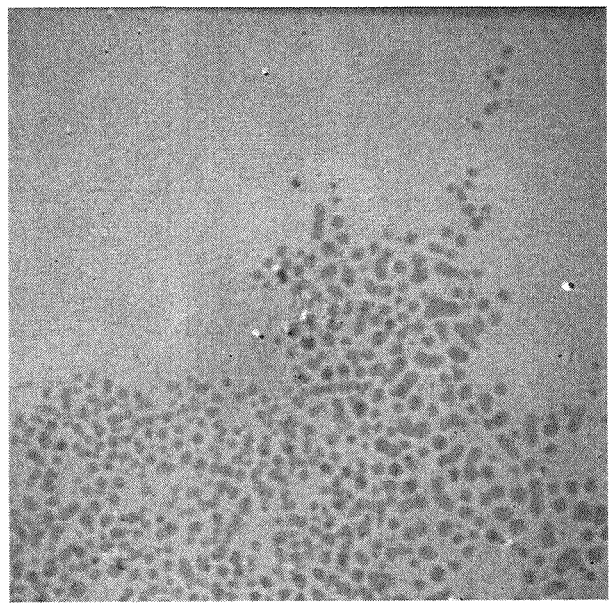
FIGS. 1(a) and 1(b) are TEM images (different magnifications) of iron oxide nanoparticles zwitterated in situ in the presence of 50 mM sulfobetaine.

In accordance with the present invention, it has been discovered that ultrasmall (e.g., ≤10 nm total diameter) superparamagnetic iron oxide nanoparticles having a plurality of chemically bound zwitterionic functional groups, which impart stability to the nanoparticle in solution, may be produced relatively easily by adding an alkoxysilane zwitterion to a solution of iron salts. More particularly, the aforementioned stabilized nanoparticles comprise a core that comprises one or more oxides of iron and a shell comprising zwitterionic functional groups chemically bound to the core, wherein said shell tends to reduce or eliminate aggregation and adhesion of the nanoparticles under a wide range of conditions.

Size and Shape

Nanoparticles may assume a variety of geometries, such as spheres, hollow shells, rods, plates, ribbons, prisms, and stars. All geometries of nanoparticles are understood to be suitable for use in this invention. In one embodiment, the nanoparticles of the present invention are spherical or approximately spherical.

As used herein, the term "size," with respect to nanoparticles, means nanoparticles able to pass through a sieve opening of that size. Sieve openings are square in shape and the size of the opening corresponds to the length of a side. For example, a spherical nanoparticle having a diameter less than 10 nm is able to pass through a 10 nm sieve opening. Similarly, a nanoparticle that is a rod having a length greater than 10 nm having and a diameter less than 10 nm is able to pass through a 10 nm sieve opening. Further, when referring to the size of a nanoparticle of the present invention, it is not intended to include any additional ligands, molecules, or moieties that have been placed on, attached to, or in contact with the zwitterionic shell such as antibodies, polymers, DNA, RNA, proteins, peptides, aptamers, or any other molecular recognition elements.

In embodiments of the present invention, the nanoparticles have a size such that they remain suspended or dispersed in a liquid or solution (without agitation), rather than settling under the influence of gravity (disregarding settling due to agglomeration). For spherical nanoparticles, in liquids having a viscosity and density about that of water, that size is typically no greater than about 100 nm. In other embodiments, including in vivo applications, the size of nanoparticles is less than about 10 nm. In certain other embodiments, including in vivo applications, the size of nanoparticles is less than about 6 nm. Unless noted otherwise, all references to size set forth herein are the average size of a multiplicity of nanoparticles Core Materials As is known in the art, any of numerous materials may be used to prepare the nanoparticles. Kotov (Nanoparticle Assemblies and Structures, CRC Press 2006.) provides a review of methods and materials for making nanoparticles. The selection of materials for making nanoparticles may depend on the desired property. For example, certain metals, alloys, and oxides are known to have magnetic (ferromagnetic, paramagnetic, superparamagnetic) properties. Examples of magnetic materials comprise chromium (III), cobalt (II), copper (II), dysprosium (III), erbium (III), gadolinium (III), holmium (III), iron (III), iron (II), manganese (II), manganese (III), nickel (II), neodymium (III), praseodymium (III), samarium (III), terbium (III), and ytterbium (III). When sufficiently small, nanoparticles of ferromagnetic material tend to become superparamagnetic (i.e., their magnetic domains cannot be permanently aligned in any particular direction). Ferromagnetic materials, such as alloys of iron and platinum, have high coercivity. Certain semiconductor materials, such as cadmium selenide, cadmium tellurium, cadmium sulfide, zinc sulfide, zinc selenide, lead sulfide, lead selenide, gallium arsenide, gallium phosphide, indium phosphide and indium arsenide are known to have useful electronic or optical properties (such as fluorescence).

In one embodiment of the present invention, the nanoparticles comprise a core that comprises one or more oxides of iron known to be paramagnetic (e.g., magnetite, $Fe_3O_4$ (which is sometimes represented as $FeO.Fe_2O_3$), or maghemite, $Fe_2O_3$). In another embodiment, the core consists essentially of one or more iron oxides such that any other elements present are at what is considered to be impurity levels (e.g., less than about 1 wt %).

In addition to iron oxide, the core may also comprise other materials such as a fluorescent group, a radioactive nuclide, an additional magnetic material, a neutron capture agent, or a combination thereof. Each of which is described in greater detail below.

In one embodiment, the core further comprises one or more fluorescent groups. Exemplary fluorescent groups include rhodamine, pyrene, fluorescein and other dyes listed in *The Molecular Probes® Handbook—A Guide to Fluorescent Probes and Labeling Technologies* 11$^{th}$ edition published by Invitrogen Inc. Compounds comprising these fluorescent groups may be introduced into a solution comprising solute iron and co-precipitated with the iron oxide or they added to the surface of the nanoparticles post synthesis.

In one embodiment the core further comprises one or more magnetic materials that comprise an element selected from the group consisting of aluminum, cerium(IV), chromium (III), cobalt(II), copper(II), dysprosium, erbium, gadolinium, holmium, manganese(II), nickel(II), neodymium, praseodymium(III), samarium(III), ytterbium(III), terbium(III), titanium(IV), yttrium, zirconium, and combinations thereof. These elements may be co-precipitated with the aforementioned iron oxide when forming the core and will typically be in the form of oxides as well.

In one embodiment, the nanoparticle core comprises one or more radioactive materials that are not magnetic. For example, iron oxide may be coprecipitated with radioactive isotopes, such as technetium-99m (U.S. Pat. No. 5,362,473), which may be useful for using the nanoparticles in conducting lung scintigraphy and radiotherapy. Exemplary radionuclides that may be incorporated in the nanoparticle, preferably in the core, include one or more of the following: $^{111}Ag$, $^{199}Au$, $^{67}Cu$, $^{64}Cu$, $^{165}Dy$, $^{166}Dy$, $^{69}Er$, $^{166}Ho$, $^{111}In$, $^{177}Lu$, $^{140}La$, $^{32}P$, $^{103}Pd$, $^{149}Pm$, $^{193}Pt$, $^{195}Pt$, $^{186}Re$, $^{188}Re$, $^{105}Rh$, $^{90}Sr$, $^{153}Sm$, $^{175}Yb$, and $^{90}Y$.

In one embodiment, the nanoparticles may be designed for use in the neutron capture treatment of tumor cells by including one or more capture agents in the nanoparticles, preferably the core. One such capture agent is $^{157}Gd$, which may be coprecipitated with iron oxides.

Zwitterion Coating

The zwitterion coating or shell comprises a plurality zwitterionic functional groups chemically bound to the core. In one embodiment, the zwitterion coating is no more than 5 nm thick. In one embodiment the coating comprises zwitterionic functional groups that are pH-dependent. In another embodiment the coating comprises zwitterionic functional groups that are pH-independent. In yet another embodiment, the coating comprises both pH-dependent and pH-independent zwitterionic groups.

Zwitterionic Functional Groups

Examples of pH-independent zwitterionic functional groups include: N,N-dimethyl-N-acryloyloxyethyl-N-(3-sulfopropyl)-ammonium betaine; N,N-dimethyl-N-acrylamidopropyl N-(3-sulfopropyl)-ammonium betaine; 2-(methylthio)ethyl methacryloyl-S-(sulfopropyl)-sulfonium betaine; 2-[(2-acryloylethyl)dimethylammonio]ethyl 2-methyl phosphate; 2-(acryloyloxyethyl)-2'-(trimethylammonium)ethyl phosphate; 2-methacryloyloxyethyl phosphorylcholine (MPC); 2-[(3-acrylamidopropyl)dimethylammonio] ethyl 2'-isopropyl phosphate (AAPI); 1-vinyl-3-(3-sulfopropyl)imidazolium betaine; 1-(3-sulfopropyl)-2-vinylpyridinium betaine; N-(4-sulbobutyl)-N Methyl-N,N-diallylamine ammonium betaine (MDABS); N,N-diallyl-N-methyl-N-(2-sulfoethyl) ammonium betaine; N,N-dimethyl-N-(3-methacrylamidopropyl)-N-(3-sulfopropyl) ammonium betaine; N,N-dimethyl-N-acryloyloxyethyl-N-(3-sulfopropyl)-ammonium betaine; N,N-dimethyl-N-methacryloyloxyethyl-N-(3-sulfopropyl)-ammonium betaine; and N,N-dimethyl-N-(3-methacrylamidopropyl)-N-(3-sulfopropyl) ammonium betaine.

Examples of pH-dependent zwitterionic functional groups include: [(2-acryloylethyl)dimethylammonio]methyl phosphonic acid; and (2-acryloxyethyl) carboxymethyl methylsulfonium chloride; and carboxybetaines; and N,N-dimethyl-Nacrylamidopropyl-N-(2-carboxymethyl)-ammonium betaine.

For applications in which the surface charge must be changed, pH dependent zwitterions are preferred. When one of the charges (either the positive or the negative) on a zwitterion functional group is neutralized, e.g., by pH change, the overall surface charge shifts. For example, in the case of a carboxylate-comprising zwitterion group, protonation (e.g., by lowering the pH to less than the pKa of the zwitterion group) will remove negative charge. In contrast, protonation of an amine-comprising zwitterion group adds a positive charge to the surface. Changing the charge in this manner changes the interaction between the SPION and other components in the suspension, including other SPIONs. In this respect, a preferred use of the SPIONs of the present invention is to add SPIONS comprising carboxy zwitterions to basic proteins (positively charged). The basic proteins precipitate out due to interaction and agglomeration with the SPIONs. The pH is raised, ionizing the carboxy zwitterions and disengaging the SPIONs from the proteins.

In one embodiment, the zwitterionic functional groups are sulfobetaines and/or phosphatidylcholines. In another embodiment, the zwitterionic functional groups are sulfobetaines of the formula or structure

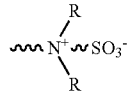

wherein the R groups are, independently, aliphatic, cyclo (pyrrolidine and piperidine), or aromatic (derivatives of phenylamine).

In one embodiment the zwitterionic functional group has the formula or structure

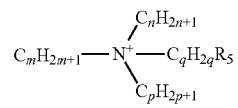

wherein m, n, p, q are each from 1 to about 18 and $R_5=SO_3^-$, $PO_4^-$, or $COO^-$. For zwitterion groups, it is preferred to have the positive and negative charges close to each other so that the possibility of these charges interacting with others in solution is minimized. For example, when using a sulfobetaine (i.e., when $R_5=-SO_3^-$) it is preferred to keep the distance between the ammonium ($N^+$) group and the sulfonate ($-SO_3^-$) group to no more than six carbon-carbon bond lengths (i.e., q is ≤6, for example, q=3 or q=4). Therefore, in one such embodiment, m, n, p, q, and r are from 1 to 6.

The following is a partial list of zwitterionic functional groups, including formulas or structures, that are suitable for this invention, wherein m, n, p, and q are each from 1 to about 18.

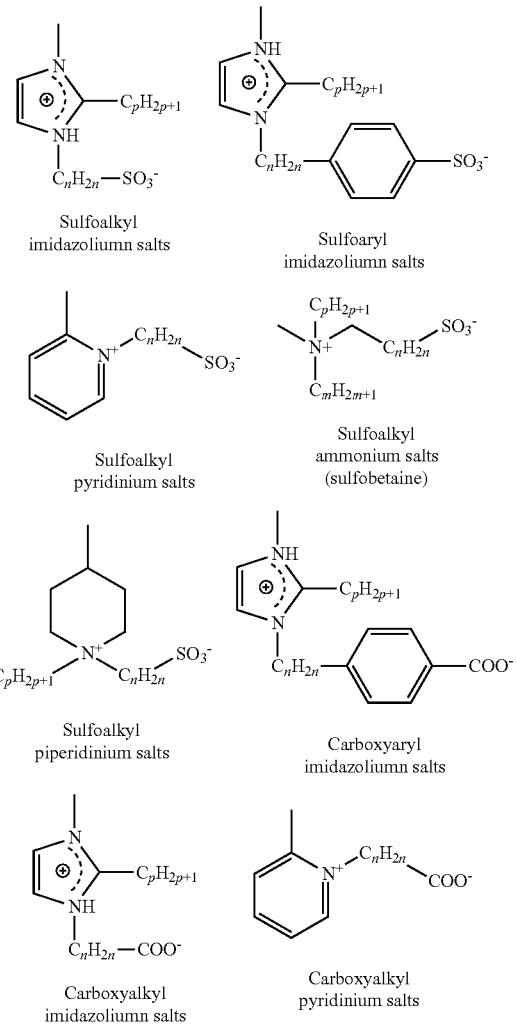

Sulfoalkyl imidazoliumn salts

Sulfoaryl imidazoliumn salts

Sulfoalkyl pyridinium salts

Sulfoalkyl ammonium salts (sulfobetaine)

Sulfoalkyl piperidinium salts

Carboxyaryl imidazoliumn salts

Carboxyalkyl imidazoliumn salts

Carboxyalkyl pyridinium salts

-continued

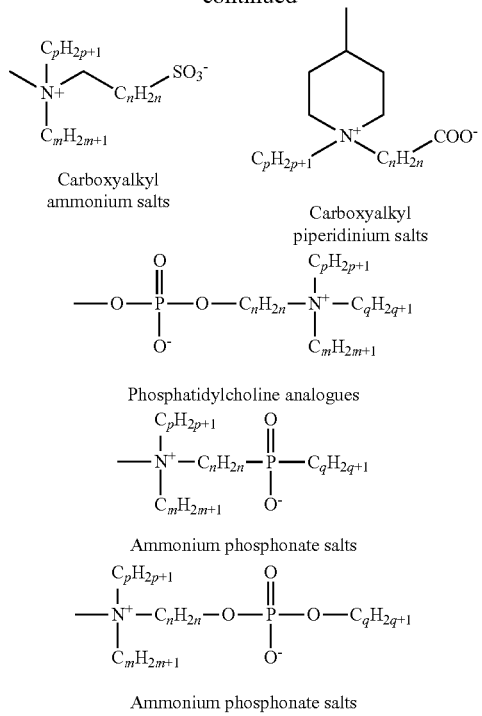

Carboxyalkyl ammonium salts

Carboxyalkyl piperidinium salts

Phosphatidylcholine analogues

Ammonium phosphonate salts

Ammonium phosphonate salts

As noted above, pH dependent zwitterions are preferred when the surface charge must be changed. When one of the charges (either the positive or the negative) on a zwitterion functional group is neutralized (e.g., by pH change) the overall surface charge shifts. For example, in the case of a carboxylate-comprising zwitterion group, protonation (e.g., by lowering the pH to less than the $pK_a$ of the zwitterion group) will remove negative charge. In contrast, for an amine-comprising zwitterion group, protonation will add positive charge to the surface.

Chemical Binding Structure

Zwitterions are chemically bound to the surface via a silane group of the following formula of structure:

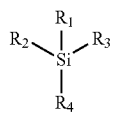

wherein $R_1$, $R_2$, $R_3$ and $R_4$ are independently selected from the group consisting of alkyl, aryl, alkoxy, aryloxy, alkylether, arylether, alkylester, arylester, amidoalkane and Surf-, wherein Surf represents an oxygen (—O—) or some other bridging group connected to the SPION surface; and wherein at least one of $R_1$, $R_2$, $R_3$ and $R_4$ comprises a zwitterion group; and wherein at least one of $R_1$, $R_2$, $R_3$ and $R_4$ comprises Surf-. For certain applications in which the nanoparticle is to be ultrasmall (e.g., <10 nm), one should typically select hydrocarbon chain lengths that provide adequate stability without increasing the particle size beyond the target. Experience to date suggests that the hydrocarbon chain lengths that are 1 to about 18 carbons long tend to provide adequate stability and contribute to the nanoparticles remaining less than about 10 nm in size.

It is well known by those skilled in the art that silanes with multiple groups reactive to hydroxyl (—OH) surfaces may not react completely with hydroxyls on the surface. Incomplete reaction will lead to a surface that is not of uniform composition.

Coating Reactants

In another embodiment, the surface zwitterion functionality may be chemically bound to the core comprising iron oxide by forming the core nanoparticles in the presence of a zwitterion silane of the following formula or structure:

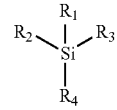

wherein $R_1$, $R_2$, $R_3$, and $R_4$ are independently selected from the group consisting of alkyl, aryl, alkoxy, aryloxy, alkylether, arylether, alkylester, arylester, amidoalkane; wherein at least one of $R_1$, $R_2$, $R_3$, and $R_4$ comprises a zwitterion group; and wherein at least one of $R_1$, $R_2$, $R_3$, and $R_4$ comprises —O—.

In another embodiment, the core is formed in aqueous solution in the presence of a monomeric zwitterion alkoxysilane (siloxanes) of the following formula or structure:

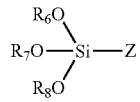

or its hydrolyzed product; wherein $R_6$, $R_7$ and $R_8$ are alkyl groups of the formula —$C_rH_{2r+1}$ wherein r is in the range of 1 to about 18; and wherein Z is a zwitterion group having the following formula or structure:

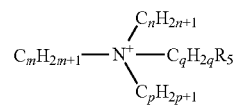

wherein m, n, p, q are 1 to about 18 and $R_5$=$SO_3^-$, $PO_4$, or $COO^-$. It is understood in the art that the reactive species of an alkoxysilane is the hydrolyzed product, wherein one or more alkoxy groups have been hydrolyzed. In one such embodiment, Z is ammonium betaine.

In another embodiment, the zwitterion alkoxysilane is 3-(dimethyl(3-(trimethoxysilyl)propyl)ammonio)propane-1-sulfonate, the chemical formula of which is, $(C_8H_{18}NO_3S)$ $Si(OCH_3)_3$ and the chemical structure of which is the following:

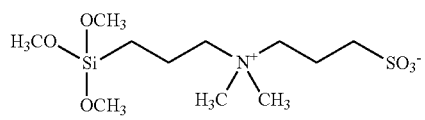

and which is known as SBS.

It has been discovered that the hydrolyzed product of SBS (i.e., the silane wherein at least one, and preferably all three, of the methoxy groups have been converted to —OH functionality by the action of water) is stable in water. The hydrolyzed siloxane does not aggregate or condense with other hydrolyzed siloxanes beyond the formation of about a dimer. This is in contrast to the well-known behavior of other non-zwitterionic alkoxysilanes-, which tend to hydrolyze and then begin the process of gradual condensation with other hydrolyzed siloxanes to yield aggregates and then gels or precipitates of networked silanes. Thus, the alkoxysilane is allowed to hydrolyze in an aqueous solution and the product of this hydrolysis bonds to the core. Optionally, a solution of the hydrolysis product of zwitterion silane may be added to the reaction mixture.

Chlorosilanes, wherein the alkoxy group in the formula above is replaced by a chlorine atom, are generally known to be more reactive to —OH groups, but are also much more reactive towards water. Thus, chlorosilanes are typically preferred for reaction in aprotic organic solvents but not water.

Jiang (US Patent Appl. 20050064192) disclose silica microparticles decorated with zwitterionic polymers for chromatographic separations. Nanoparticles comprising polymers attached to the surface via physical or chemical interactions, whether synthetic or natural, including zwitterionic polymers (i.e., polymers having a backbone with multiple zwitterionic pendant groups), are not preferred in the present invention because they add significantly to the total size of the nanoparticle. Rather, it is preferred that the zwitterionic silane reagent is monomeric, having one, at most two, zwitterionic group(s) per molecule. For example, a monomeric zwitterionic silane coating, such as a zwitterionic silane coating, even if it is more than one monolayer, may be used to provide a coating or shell that may be less than about 2 nm in thickness.

Preparation Methods

Methods for preparing an aqueous solution of SPIONs to which zwitterions are attached will be described with particular attention to SPIONs of total diameter less than 10 nm and zwitterion alkoxysilane. These methods include providing a chemically bound non-polymeric zwitterion coating on the SPION during SPION synthesis in aqueous solution. It was discovered that the addition of a zwitterion alkoxysilane to the solution of iron salts before the addition of the precipitating agent (ammonium hydroxide in this case) used to form the SPIONs resulted in unusually stable, small, monodisperse nanoparticles.

Coating of the SPION after nanoparticle formation is termed a "post-synthesis" method. A synthesis where the zwitterion coating material is present during formation of the metal oxide nanoparticle is termed an "in situ" synthesis. It will become apparent that the in situ synthesis is preferred for preparing SPIONs having a size that is 10 nm or less.

The medium for reaction comprises between 1 and 100% water, the balance (if any) being made up by an organic solvent such as ethanol, methanol, DMF, DMSO, 1,4 dioxane, THF, acetonitrile, acetone, n-butanol, isopropanol, and n-propanol. If an organic solvent system is to be used, it is generally desirable for enough water to be present to promote the hydrolysis/condensation reactions that attach the zwitterion silane to the surface. In one embodiment, the reaction(s) is/are carried out using zwitterions alkoxysilanes in aqueous solutions comprising at least 50 wt % water.

It is well known by those skilled in the art that surface reactions are incomplete. Incomplete reaction will lead to a surface that is not of uniform composition. While it is not required for all the surface sites to have reacted, preferred nanoparticles have at least 25% of their potential points of surface reaction actually converted by a reaction.

While many schemes for the covalent or chemical binding of molecules to various types of surfaces are known to the art, silane coupling chemistry is by far the most widely practiced art. As such, as set forth above, the reaction may employ silanes with hydrated oxide surfaces. Accordingly, the surface zwitterion functionality may be obtained by the formation of iron oxide nanoparticles in the presence of one or more of the above-described zwitterion silanes. Results to date suggest that preferred zwitterion silanes may be alkoxysilanes (siloxanes) (i.e., where at least one of $R_1$, $R_2$, $R_3$, and $R_4$ is alkoxy, as opposed to, for example, chloro) and the preferred reaction medium is water.

In one embodiment, water soluble salts comprising magnetic elements (e.g., a mixture of iron II and iron III salts) may be employed. Exemplary salts include ferric chloride hexahydrate, iron (II) chloride tetrahydrate, ferric nitrate, ferrous nitrate. The precipitation agent is preferably a base, more preferably ammonium hydroxide. The reaction is conducted at temperatures such that the reaction medium is in a liquid state. Typically, the temperature is in the range of about 10° C. to about 80° C. and preferably in the range of about 20° C. to about 40° C. for precipitation.

If an in situ reaction is performed, an additional heating step is often preferred. Such a step comprises raising the temperature to, for example, in the range of about 60° C. to about 80° C. for a duration in the range of a few minutes to about an hour, and then decreasing the temperature to less than about 60° C. Any method of heating is acceptable, including the use of radiofrequency heating. Heating after the in situ synthesis is believed to promote additional condensations of unreacted OH— with either the surface or other siloxanes. For example, if $R_1$, $R_2$ and $R_3$ are methoxy ($CH_3$—O—) they will undergo hydrolysis in aqueous solutions. The hydrolyzed groups (OH—Si) condense with the oxide nanoparticle surface, producing what are believed to be Fe—O—Si— chemical bonds. It is typical for siloxanes bearing more than one reactive group ($CH_3$—O— in this case) to react partially with surfaces. For example, if there are three $CH_3$—O— groups on the silane, one, two, or three groups can condense with either the surface or with other silanes. If one group condenses, the other two may independently either condense with the surface or with another silane. Condensations with other silanes promote a network of Si—O—Si bonds which are thought to make the surface silane coating more rugged.

Silanes that have only one alkoxy group (i.e., are "monofunctional" such as when $R_1$ is alkoxy and $R_2$ and $R_3$ are alkane) condense on the surface with only one point of attachment. Monofunctional attachment provides for monolayer coverage but bifunctional or trifunctional attachment is believed to provide a more resilient coating.

In accordance with the method of this invention, the core comprising iron oxide is formed in the presence of one or more zwitterion silanes. For example, the zwitterion silane(s) may be added to, and dissolved in, the mixture comprising iron salts prior to adding a base. Alternatively, the zwitterion silane(s) may be mixed with a base and the mixture may then be added to iron salts. Any combination of mixing that forms the nanoparticles in the presence of one or more zwitterion silanes in solution is suitable. That said, results to date suggest that mixing the zwitterion silane(s) with the iron salts before adding a base may be preferable.

Figure 3:
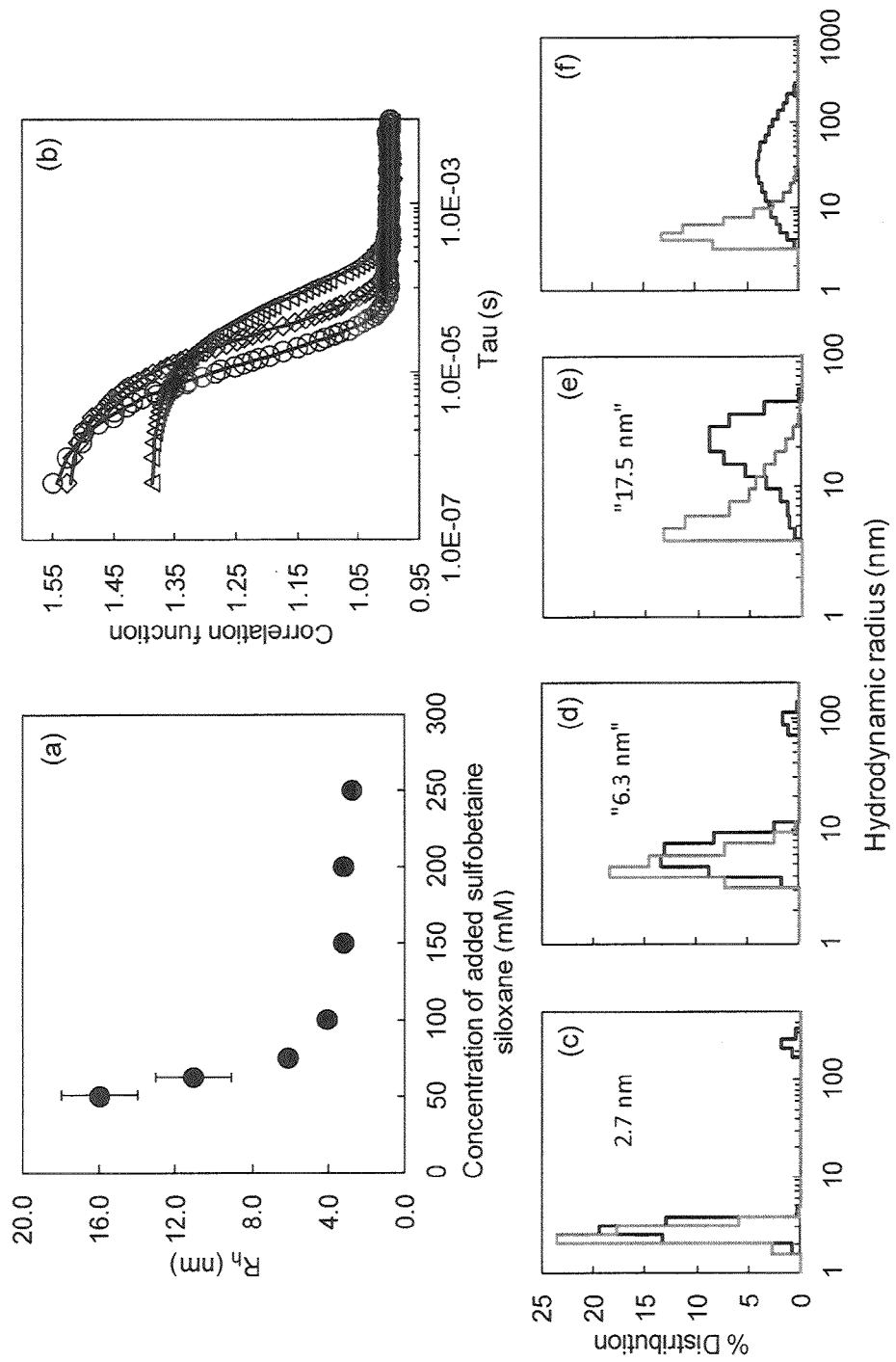
FIG. 3(a) is a graph of the hydrodynamic radii of iron oxide nanoparticles formed in the presence of different molar concentrations of sulfobetaine siloxanes.
FIG. 3(b) is a graph of the correlation function for the measured sizes shown in FIG. 3(a)—2.7 nm (circles), 6.3 nm (diamonds), and 17.5 nm (triangles)
FIGS. 3(c)-(e) are graphs of the intensity distribution (black) and number distribution (grey) for the correlation function shown in FIG. 3(b)
FIG. 3(f) is a graph of the intensity distribution (black) and number distribution (grey) for iron oxide nanoparticles zwitterated post-synthesis.

The preferred concentration of silane depends on the concentration of soluble constituents (e.g., iron salts) used to make the nanoparticle. For example, in an embodiment in which the soluble core constituents are only iron salts, preferred molar ratio of total silane to total iron salts is greater than 0.2 silanes to 1 iron salts. In Example 6 below, a total of 6 mmol of iron salts—4 mmol of $Fe^{3+}$ (ferric) and 2 mmol $Fe^{2+}$ (ferrous)—was mixed with 50 mL of various sulfobetaine siloxane concentrations. The use of 50 mL 50 mM siloxane resulted in a molar ratio of iron salts to siloxane of 6:2.5 and produced spherical nanoparticles having a diameter of about 32 nm. In contrast, the use of 50 mL of 0.1M (100 mM) resulted in a molar ratio of iron salts to siloxane of 6:5 and produced nanoparticles had a diameter of about 8 nm. Thus, surprisingly, more siloxane yielded smaller particles. When the ratio of iron salts to siloxane was about 6:10, the diameter of the nanoparticles was about 6 nm. Increasing the concentration of siloxane decreased the nanoparticle diameter further. An upper limit of siloxane concentration was not determined but as shown in FIG. 3 a molar ratio of iron salts to siloxane above about 1:2 did not yield appreciably smaller particles. As a result, for this system, it is believed that the preferred molar ratio of iron salts to silane is in a range of about 5:1 to about 1:5 and more preferably in a range of about 2:1 to about 1:2.

In addition to controlling nanoparticle size by controlling the relative amounts of core and coating constituents, it is shown that size may be controlled by the type of process. For example, an in situ synthesis process tends to result in smaller SPIONs compared to a post-synthesis process. This result was neither expected nor easy to explain.

In one or more embodiments, the nanoparticles may comprise other metal ions such as manganese or non-metals such as gadolinium, which may be added to the reaction mixture for the in situ synthesis or doped into the nanoparticle post synthesis by exposing a solution of the nanoparticles to a solution comprising the dopant. To aid in the exchange of iron with a dopant, a complexing agent known to preferentially complex iron ions, such as EDTA, may be added to the dopant solution.

In one or more embodiments, the nanoparticles may be formed in the presence of a mixture of silanes to yield a mixed surface composition. For example, in addition to the zwitterion silane(s), the mixture may further comprise silanes bearing mercapto, ureido, epoxy, acrylyl, methacrylyl, carboxyl and/or amino groups, which may allow for further reaction(s) with other synthetic or biological molecules, which may result in nanoparticles that are useful for a variety of applications that involve, for example, molecular recognition or for targeting to enable nanoparticles to interact selectively with a tissue or cell type. Accordingly, the nanoparticle surface may further comprise at least one of the following: oligonucleotides, polypeptides, enzymes, polysaccharides, aptamers, proteins, folic acids, sialic acids, sugars, fatty acids, and antibodies or fragments thereof. Additionally, the mixture may further comprise one or more compounds selected from the group consisting of polymers, oxidizing agents, chelating agents, surfactants, buffers, passivating agents, viscosity modifiers, wetting agents, stopping compounds, and lubricants. These components may be added to the reaction mixture or they may be added to the surface of the zwitterion-decorated nanoparticle after synthesis. Because the zwitterion functionality is effective at repelling other molecules, it is believed to be preferable to add such additional components to the reaction mixture, preferably before or at the same time as the base.

An aqueous suspension of the zwitterion coated nanoparticle may then be prepared. The suspension may be in the form of a colloidal suspension or "solution" of nanoparticles.

EXAMPLES

Reagents and General Methods (N,N-dimethyl-3-aminopropyl)trimethoxysilane from Gelest and (3-aminopropyl)triethoxysilane, 99%, from Fisher Scientific were stored under Ar, and used as received. Ferric chloride hexahydrate (ACS grade) was from EMD chemicals. Iron (II) chloride tetrahydrate, 98% was from Alfa-Aesar. Fetal bovine serum, FBS (VWR), was stored at −20° C. Bovine albumin, fraction V (BSA, Sigma-Aldrich, 99%) was stored at 4° C. Ammonia 28-30% (ACS reagent) was from Sigma Aldrich. Sodium phosphate monobasic (ACS grade), sodium phosphate (ACS grade), sodium acetate trihydrate (certified ACS crystal), boric acid (certified ACS), NaCl (ACS grade), and 1-10 phenanthroline monohydrate were from Fisher Scientific. Propane sultone was obtained from TCI America. Spectra/Pro dialysis tubing (MWCO 3 500) was from VWR.

The zwitterion siloxane 3-(dimethyl(3-(trimethoxysilyl) propyl)ammonio)propane-1-sulfonate (sulfobetaine siloxane or SBS, 329.5 g mol$^{-1}$) was synthesized as described in PCT Publication number WO 2007/146680 A1, which is hereby incorporated by reference, using (N,N-dimethyl-3-aminopropyl)trimethoxy silane and propane sultone under inert conditions.

Example 1

Post-Synthesis Zwitteration

In this Example, nanoparticles were prepared, then a zwitterion layer was produced on the surface of the particles. In this "post synthesis" method, 4 mmol of $FeCl_3$ in $H_2O$ and 2 mmol $FeCl_2$ dissolved in 2 M HCl were mixed with a magnetic stir bar, followed by the addition of 50 mL of 0.7 M $NH_4OH$. Addition of ammonia resulted in a black precipitate of nanoparticles. 5 mmol of SBS solution was added directly into the reaction flask and stirred vigorously. The latter step reversed the precipitation process allowing the particles to redisperse into the solution. The whole mixture was then heated at 80° C. for 6 hours. After cooling to room temp, ethanol was added to the aqueous reaction medium (EtOH: $H_2O$ 3:1) and the particles were collected with a magnet. Several washing and collecting steps were followed using ethanol. The particles were dried under $N_2$ and stored.

Example 2

In Situ Zwitteration

This Example illustrates forming iron oxide nanoparticles in the presence of a zwitterion siloxane. To the iron salts mixed according to the ratio in Example 1, 50 mL of different molar concentrations of freshly prepared sulfobetaine siloxane solution was added. The solution was mixed and 50 mL of 0.7 M $NH_4OH$ was then added in one portion to yield a black solution of iron oxide nanoparticles. The solution was covered with a watch glass and immersed in a pre-heated water bath at 80° C. for 1 hour.

Example 3

Introduction of Amine Functionality Along with Zwitterions Functionality

The introduction of amine functionality onto the surface was achieved using (3-aminopropyl)triethoxysilane (APTES). In this case, 100 microL of APTES was injected into the hot reaction mixture 30 minutes post heating, other parameters remained unchanged. The reaction was allowed to proceed for another 30 minutes before being cooled to room temperature.

Example 4

Exceptional Stability of In Situ Prepared Nanoparticles

Particles prepared under in situ conditions were very stable. Magnetic collection was difficult to achieve as the effective size decreased. Particles were therefore dialyzed against salt solution to remove unreacted siloxane. The presence of a small amount of salt was needed to prevent particle aggregation. Particles were first dialyzed against 0.1 M NaCl for 24 h, followed by 10 mM NaCl for 2 days, lyophilized and stored. For phase identification and magnetization measurements, particles were further dialyzed against 18 Mohm $H_2O$ for an additional 2 days. For comparison purposes, untreated nanoparticles were prepared in a similar manner without SBS. In this case, 50 mL of water was used instead of the SBS solution. The precipitate was then collected magnetically, washed 3 times with water, dried under $N_2$, and stored.

Example 5

Particle Sizes by Microscopy

TEM images were acquired on a JEOL-2010 high resolution TEM operated at 200 kV. Particles were dispersed in water at a concentration of 5 mg mL$^{-1}$ and 5-10 microL were dispensed on carbon coated 300 mesh Cu grids (CF300-Cu from Electron Microscopy Sciences).

Figure 1B:
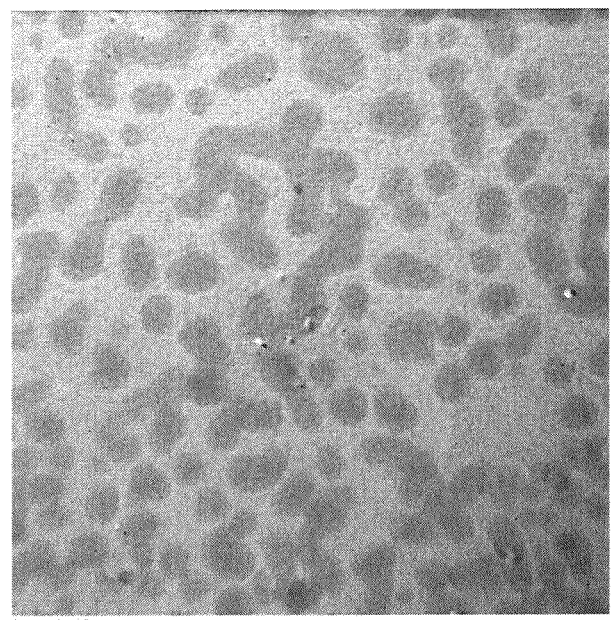
Figure 2A:
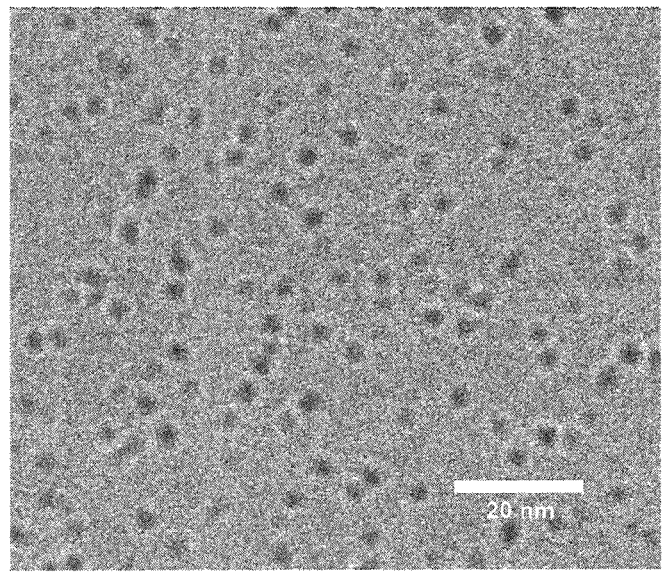
FIG. 2(a) is a Cryo-TEM image of iron oxide nanoparticles prepared in situ with 250 mM SBS (Dh=5.8 nm) in vitrified ice on carbon grids within 2 μm holes.
Figure 2B:
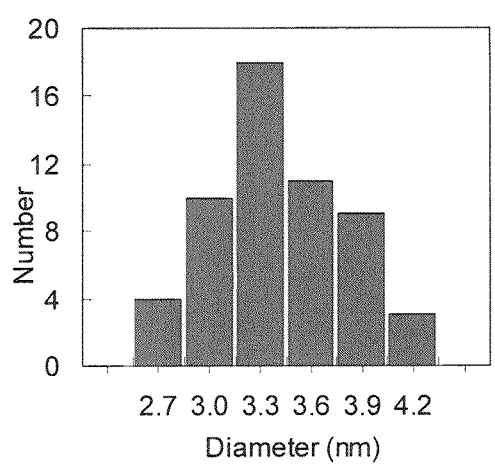
FIG. 2(b) is a graph of the size distribution of the same iron oxide nanoparticles.

Aggregation for lower SBS concentrations is supported by TEM images where some fusion of particles is observed (FIG. 1). In comparison, Cryo-TEM (imaged with a Titan Krios TEM at 120 KeV) for the smallest particles (Dh=5.8 nm) shows monodisperse particles with no sign of aggregation (FIG. 2). Contrast from the cryo-TEM reveals only the iron oxide cores with a diameter of 3.3±0.4 nm,

Example 6

Narrow Size Distribution, Stable Unagglomerated Nanoparticles Via In Situ Zwitteration Dynamic light scattering (DLS) was used for particle sizing. Particles were dispersed in 10 mM PBS (140 mM NaCl, pH 7.4) and pumped through the flow cell at a flow rate of 10 mL h$^{-1}$. Sizing was performed with Wyatt QELS collecting at 108° to the incident 690 nm laser beam in a Wyatt DAWN EOS instrument with a 2 second collection interval and analyzed with ASTRA 5.3.4 software.

The zwitterated nanoparticles were easily dispersed in phosphate buffer (140 mM NaCl, pH 7.4). Dynamic light scattering was used to characterize the size and polydispersity of these particles. Post-synthesis addition of zwitterion siloxane resulted in a polydisperse system with particle sizes varying from batch to batch and ranging from 14 to 24 nm in hydrodynamic radius (FIG. 3). Alternatively, particle size for samples zwitterated in situ varied as a function of added sulfobetaine siloxane. The hydrodynamic radius of the particles decreased as the concentration of sulfobetaine siloxane increased. At lower sulfobetaine siloxane concentrations (50-100 mM), the hydrodynamic radius decreases rapidly with increasing concentration. This decrease becomes less apparent as the concentration approaches 100 mM where the hydrodynamic radius changes from 4 nm to 2.7 nm over the 100-200 mM region. A closer look at the size distribution of these samples shows that the increase in the effective hydrodynamic size of these particles is a result of the polydispersity of the system as can be inferred from the intensity distribution and number distribution (c-e). As the sulfobetaine siloxane concentration increases, the distribution becomes more narrow. Decreasing the sulfobetaine siloxane has a more pronounced effect on the intensity distribution thus leading to a higher effective hydrodynamic size since the former scales with the sixth power of size. Decreasing the concentration of sulfobetaine siloxane solution below 50 nm resulted in aggregation and precipitation of particles, whereas increasing the concentration beyond 200 mM did not result in further reduction in particle size. In fact, in certain cases, further increase in concentration resulted in increasing the polydispersity of the system. Thus, the preferred concentration of zwitterion siloxane for these conditions was at least 50 mM and more preferably about 150 mM.

For samples prepared in situ, the initial solution was black. However, a brown-red color started to develop as the reaction cooled to room temperature. This is attributed to magnetite oxidation to yield maghemite. Inert conditions (deoxygenated solutions) did not slow down this transformation.

Example 7

Proof of Zwitterions on the Surface of Nanoparticles

Diffuse Reflectance Infrared Fourier transform (DRIFT) and Thermogravimetric analysis (TGA) were used to verify the presence of sulfobetaine siloxane on the surface. DRIFT spectra were collected on ground nanoparticles mixed with KBr under nitrogen using a Nicolet Avatar 360 FTIR with a DTGS-KBr detector. One thousand scans were performed on each sample at 4.0 cm$^{-1}$ resolution, and spectra were referenced against a KBr background. TGA was performed with SDT Q600 (TA Instruments) under $N_2$ flow rate of 100 mL min$^{-1}$. The temperature of the oven was ramped to 105° C. and held for 20 minutes to ensure desorption of adsorbed water, after which the temperature was ramped to 600° C. at a rate of 10° C. min$^{-1}$. TGA was performed on hydrolyzed SBS, zwitterated iron oxide nanoparticles, and control (non zwitterated) sample.

Figure 4:
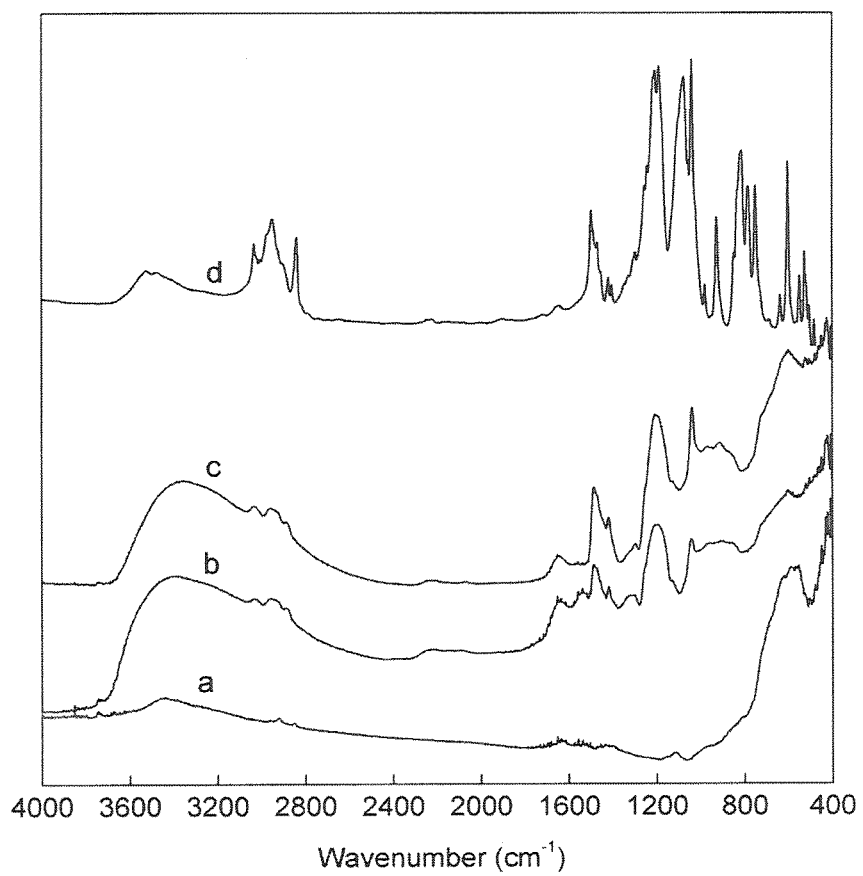
FIG. 4 is a graph of: (a) a DRIFT spectrum of non-zwitterated iron oxide nanoparticles, (b) a DRIFT spectrum of post-synthesis zwitterated iron oxide nanoparticles, and (c) a DRIFT spectrum of in situ zwitterated (200 mM sulfobetaine siloxane) iron oxide nanoparticles; and (d) a FTIR spectrum of non-hydrolyzed SBS. The spectra were at 4.0 $cm^{-1}$ resolution.

DRIFT spectra and TGA proved the presence of sulfobetaine siloxane on the surface of these particles. FTIR spectrum of the control sample shows a set of broad and unresolved peaks in the range 500-640 cm$^{-1}$ with a shoulder at 725 cm$^{-1}$ which are attributed to Fe—O lattice vibrations of magnetite or maghemite (FIG. 4). The presence of sulfobetaine siloxane was confirmed by the absorption bands at 1040 cm$^{-1}$ and 1200 cm$^{-1}$ which are attributed to the sulfonate stretching vibrations, in addition to the peaks at 1420 cm$^{-1}$ corresponding to Si—O—, 1490 cm$^{-1}$ attributed to —$CH_2$ scissoring, and the —$CH_2$ stretching vibrations in the 2900-3050 cm$^{-1}$ region (FIG. 4). For comparison purposes, the FTIR spectrum of sulfobetaine siloxane monomer is also shown.

Figure 5:
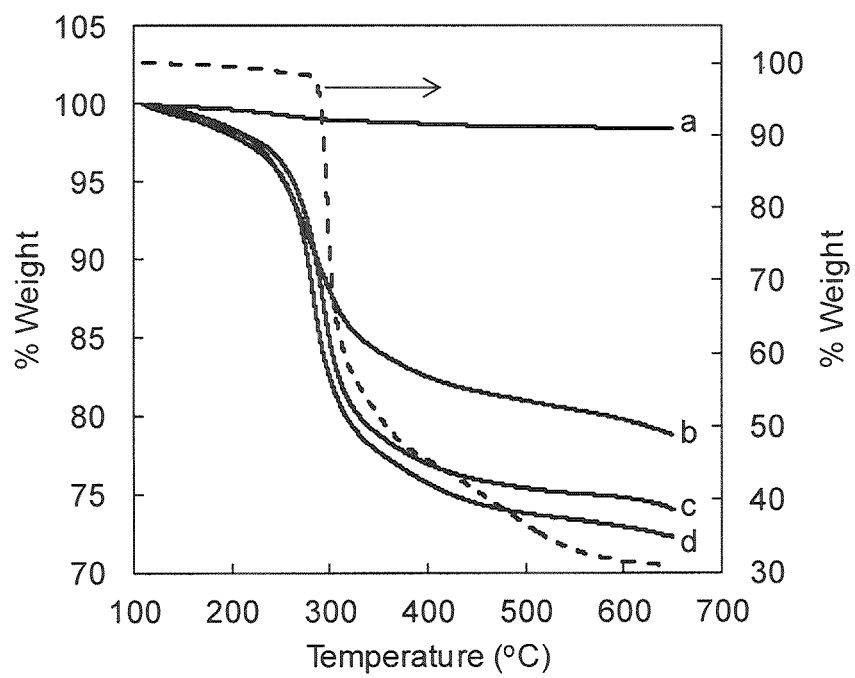
FIG. 5 is graph of thermogravimetric analyses (TGA) (in reference to left vertical axis, % Weight) of the following iron oxide nanoparticles: (a) non-zwitterated, (b) in situ zwitterated with 50 mM sulfobetaine siloxane ("17.5 nm"), (c) post-synthesis zwitterated, and (d) in situ zwitterated with 250 mM sulfobetaine siloxane (2.7 nm radius). TGA for hydrolyzed sulfobetaine siloxane monomer is shown as a dashed line in reference to the right vertical axis, % Weight, as indicated by the arrow.

TGA runs on zwitterated samples showed a weight loss in the temperature range 220-400° C. in agreement with the weight loss for the hydrolyzed sulfobetaine siloxane monomer in this region (FIG. 5). The percent loss attributed to siloxane shell for particles zwitterated post-synthesis with 250 mM SBS was 25.3%, whereas a minimal weight loss was observed for the non-zwitterated sample over the entire temperature range. Taking into account the small weight loss of non-zwitterated sample, the fact that 31.5% of the monomeric sulfobetaine siloxane remains intact after TGA (presumably as silica), one can estimate the thickness of the sulfobetaine siloxane shell. Assuming the density of the iron oxide core to be similar to bulk maghemite (4.88 g cm$^{-3}$), and a density of 1.1 g cm$^{-3}$ for the sulfobetaine siloxane shell, a particle with core diameter of 3.3 nm (from TEM) should have a shell thickness of 1.1 nm, for a total diameter of 5.5 nm. The shell thickness is slightly less than the calculated length of the sulfobetaine siloxane (1.3 nm).

Example 8

X-Ray Diffraction Measurements of Iron Oxide Nanoparticles

Powder X-ray diffraction was performed with Siemens D500 diffractometer with a Ni-filtered non-monochromated source and a graphite diffracted beam monochromator. 1° divergence apertures and 0.15° receiving apertures were used. Data were analyzed with JADE 7 software. The crystallite size was calculated by fitting the data to a Gaussian distribution and applying the Scherrer equation for the (311) diffraction peak.

Powder X-ray diffraction was used to validate the formation of maghemite. A non-zwitterated sample was prepared in this case to act as a control and a reference. pXRD of non-zwitterated sample (FIG. 6) shows a set of peaks in the 30-80° range indexing to the inverse spinel structure of maghemite. Peak broadening was observed in this case due to the small size of these nanocrystals as particles prepared according to this method are reported to have an average diameter of 12 nm, in agreement with the 12±2 nm crystallite size calculated using the Scherrer equation on the (311) diffraction peak.

Figure 6:
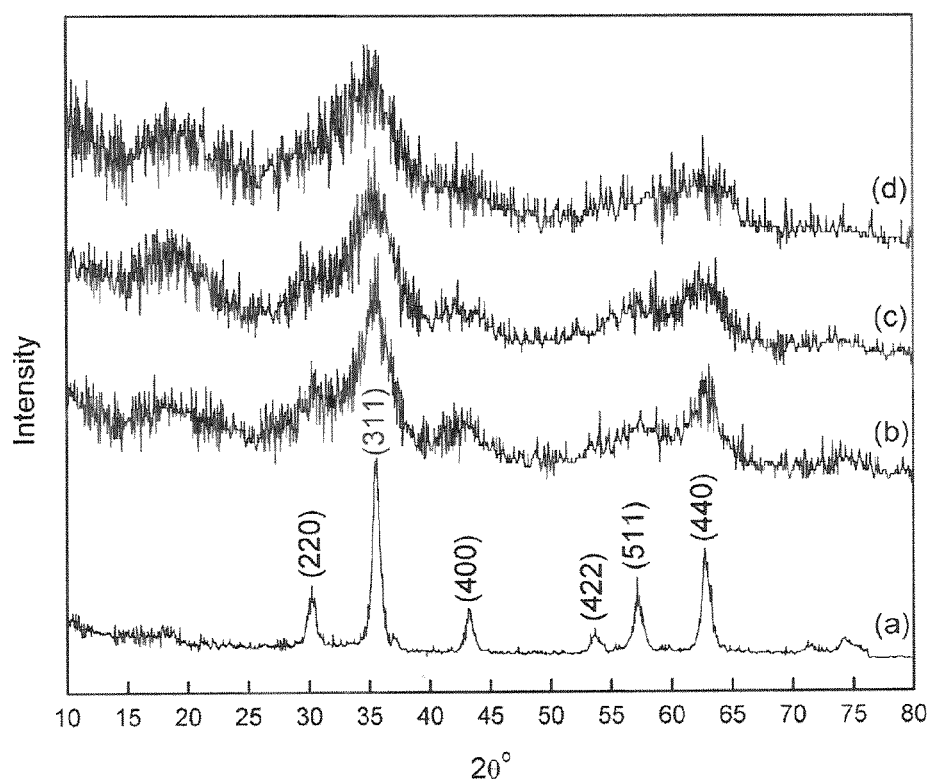
FIG. 6 are powder X-ray diffraction patterns of the following iron oxide nanoparticles: (a) non-zwitterated, (b) post-synthesis zwitterated, (c) in situ zwitterated (50 mM sulfobetaine siloxane), and (d) in situ zwitterated (200 mM sulfobetaine siloxane). The diffraction patterns are indexed to the inverse spinel structure of maghemite.

The post-synthesis addition of sulfobetaine siloxane to particles resulted in a diffraction pattern similar to that of the non-zwitterated sample (FIG. 6). However, the peaks suffered from further broadening due to an increase in amorphous content and decrease in crystallite size. Although the data is noisier, the Scherrer equation in this case yielded a rough estimate of 3.3 nm for the crystallite size.

Example 9

Magnetic Characterization of Iron Oxide Nanoparticles

Magnetic characterization of the different iron oxide nanoparticles was performed in a Quantum Design MPMS SQUID magnetometer. Magnetization versus applied field (B vs H) curves were conducted at 298 K under a maximum applied field of ±70 kOe. Zero-field-cooling (ZFC) and field-cooling (FC) magnetization curves were measured at 100 Oe in the temperature range 5-300 K. All magnetization values were normalized to the total mass of the powder sample (including the capping ligand). Iron concentration was determined spectrophometrically. Nanoparticles were digested in 1 M HCl. Aliquots were then reduced with 10% w/v hydroxylamine hydrochloride and complexed with 0.3% w/v o-phenanthroline. The pH of the solution was adjusted with 10% w/v sodium acetate to yield a red solution that absorbs at 510 nm. Calibration curve was constructed from pure Fe metal pieces.

Figure 7:
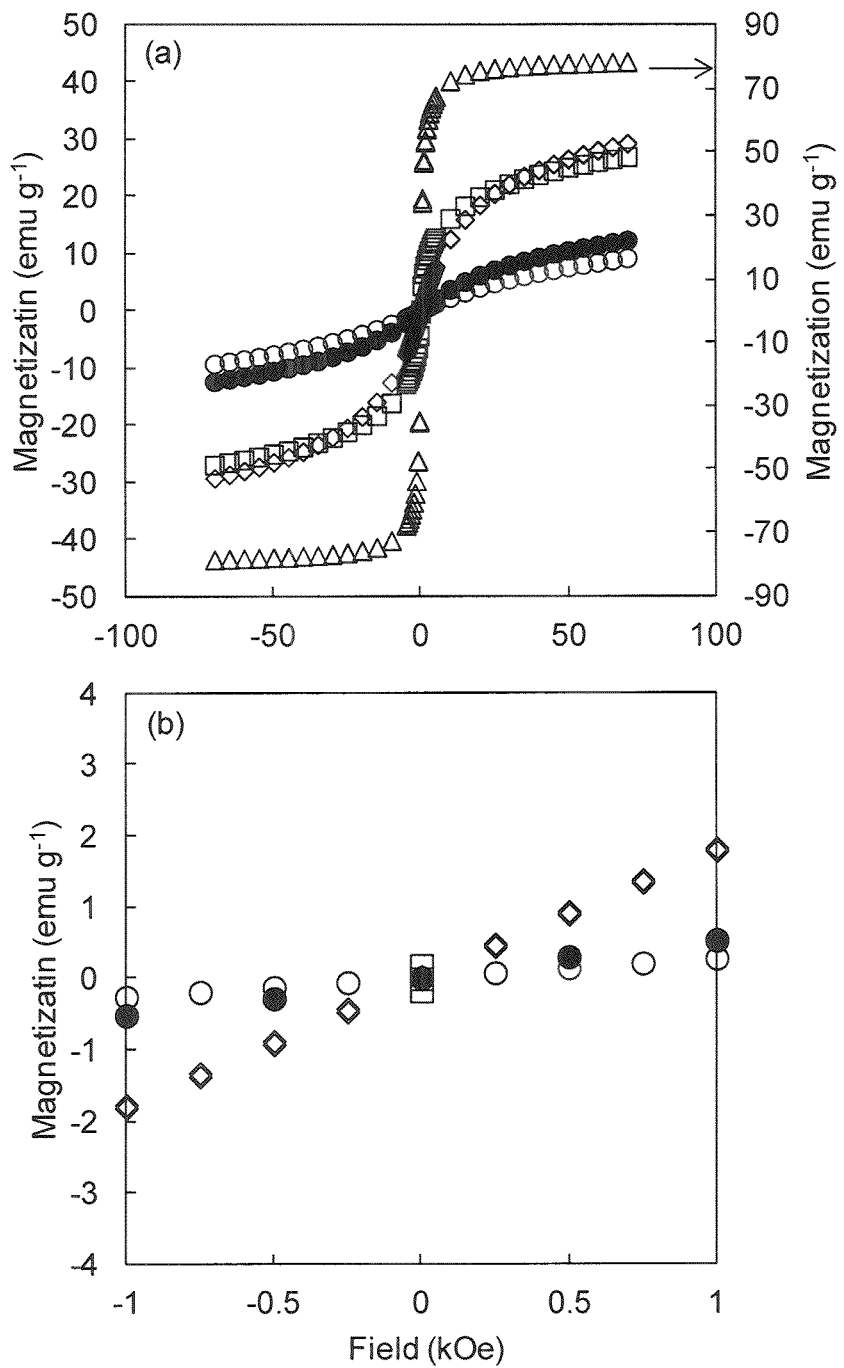
FIG. 7 is two graphs of magnetization data: the (a) graph is magnetization data for the following iron oxide nanoparticles at 298° K: non zwitterated (Δ, right axis as indicated by the arrow), post-synthesis zwitterated (□, left axis), in situ zwitterated "17.5 nm" sample (◊, left axis), in situ zwitterated 2.7 nm radius sample (○, left axis), and in situ zwitterated 2.7 nm radius sample heated at 80° C. for 6 h (●, left axis); and the (b) graph is magnetization data from the materials set forth in the (a) graph in the range +1 to −1 kOe confirming the absence of coercive field in accordance with superparamagnetic behavior. All data is normalized to the total mass of the sample.

FIG. 7 shows the field dependent room temperature magnetization of the different IONs. The absence of hysteresis confirms superparamagnetic behavior. Non-zwitterated samples reach a saturation magnetization of 78 emu g$^{-1}$ in agreement with values reported for bulk maghemite. On zwitteration, a drop in the magnetization was observed, but the samples do not saturate even at high applied field. Interestingly, the magnetization behavior of the post-zwitterated iron oxide is similar to that zwitterated in situ with 50 mM sulfobetaine siloxane (corresponding to the largest effective hydrodynamic diameter) with a magnetization value of 41±1 emu g$^{-1}$ at 70 kOe. On the other hand, further reduction in the magnetization value to ca. 15 emu g$^{-1}$ at 70 kOe is observed for the smallest particle zwitterated in situ with the sample being still far from saturation. The drop in magnetization is attributed to the low structural order (low crystallinity) as indicated by XRD, and to a non-collinear spin arrangement at or near the surface. A zwitterated nanoparticle of about 5.8 nm hydrodynamic diameter comprised a core of iron oxide that is about 3.3 nm diameter iron oxide (see TEM data above). Assuming a spin canted layer of 0.9 nm, then 94% of the spins are canted resulting in reduced magnetization.

Figure 8:
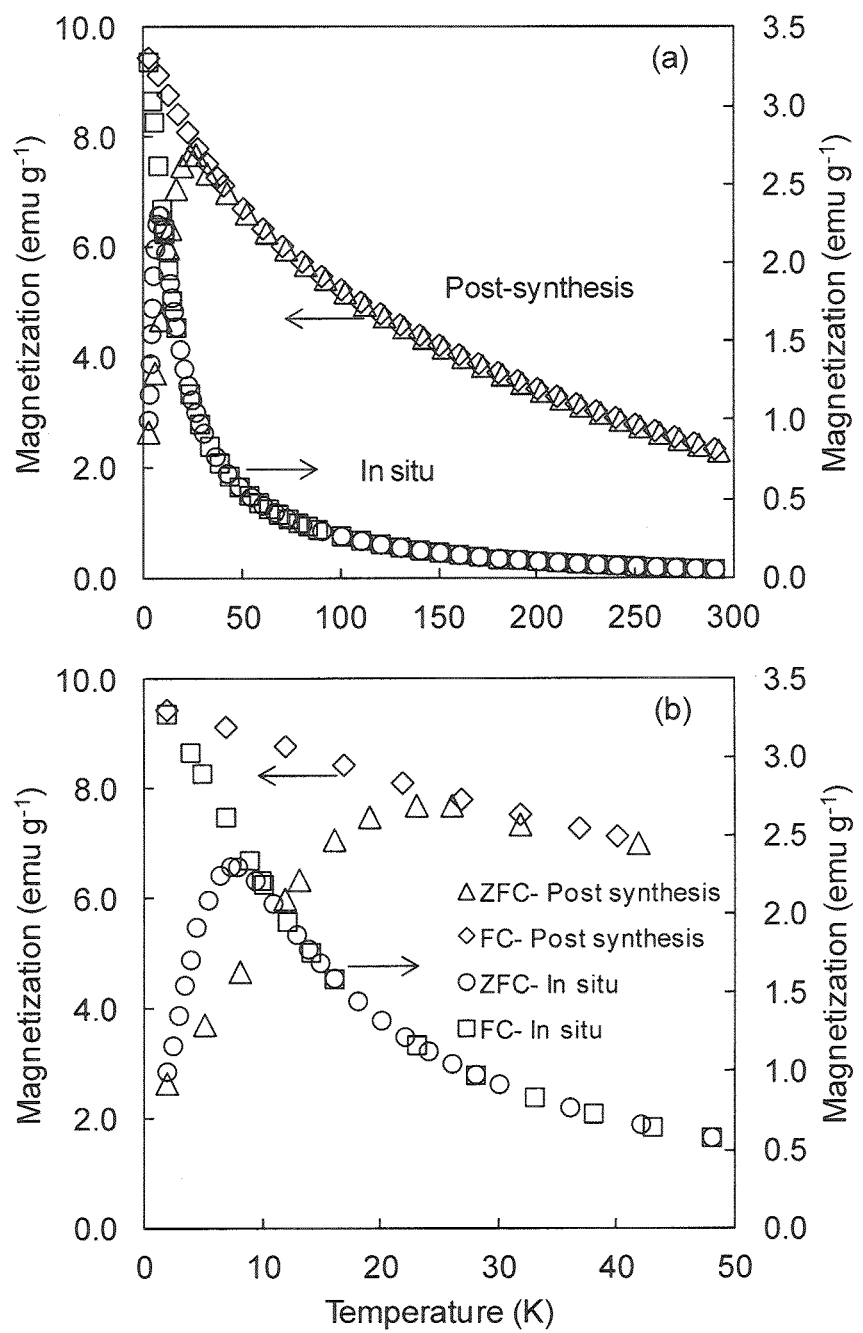
FIG. 8 is two graphs of FC-ZFC magnetization data: the (a) graph is FC-ZFC magnetization curves at H=200 Oe for iron oxide nanoparticles zwitterated post-synthesis (right axis) and in situ (2.7 nm radius, left axis); and the (b) graph is FC-ZFC data in the range 0-50° K. All data is normalized to the total mass of the sample.

The effect of heating on magnetization is also shown in FIG. 8. Although the hydrodynamic size of the particle does not increase, heating the solution for 8 hours during synthesis increases the magnetization value for the smallest particle from 15 to 21 emu g$^{-1}$ indicating annealing of the iron oxide core. Thermally-induced crystallization of amorphous $Fe_2O_3$ to yield crystalline maghemite is commonly performed on dry material at temperatures above 280° C. FIG. 5 suggests annealing at temperatures around 250° C. might be possible without thermal decomposition.

Zero field cooling (ZFC) and field cooling (FC) for samples zwitterated post-synthesis or in situ are shown in FIG. 8. The irreversibility temperature at which the ZFC and FC curves diverge ($T_{irr}$) corresponds to the blocking temperature ($T_B$) of the largest particle, whereas the maximum in ZFC curve ($T_m$) corresponds to the average blocking temperature through the sample. For individual samples, it can been seen that $T_m$ and $T_{irr}$ are close, occurring at 23 K for post-synthesis zwitteration and 8 K for in situ zwitteration. This can be taken as a reporter of interparticle interaction. In strongly interacting particles, there is a distinct separation between $T_{irr}$ and $T_m$. Such a separation is absent in these particles suggesting weak interparticle interactions. This is also supported by the continuously increasing magnetization value of FC curve below $T_m$ that would otherwise remain constant in strongly interacting particles.

Example 10

Stability of Iron Oxide Nanoparticles

The stability of the zwitterated iron oxide nanoparticles was tested with turbidimetry. Particles were dispersed at a final concentration of 0.1% w/v in 10 mM PBS (140 mM NaCl, pH 7.4) and measured for 15 h to check for stability in buffer. In a separate experiment, 0.1% w/v zwitterated iron oxide nanoparticles were incubated with 50% v/v FBS in 10 mM PBS (140 mM NaCl, pH 7.4) to check for stability under biomimetic conditions. All measurements were performed at 700 nm and 37° C.

Protein adsorption on the surface of zwitterated nanoparticles was followed with DLS. 1% w/v of 4 nm particles were incubated with 10% w/v BSA (10×4×4 nm$^3$) in 10 mM PBS at 37° C. for 3 h. Measurements were then conducted as explained earlier for particle sizing.

Figure 9:
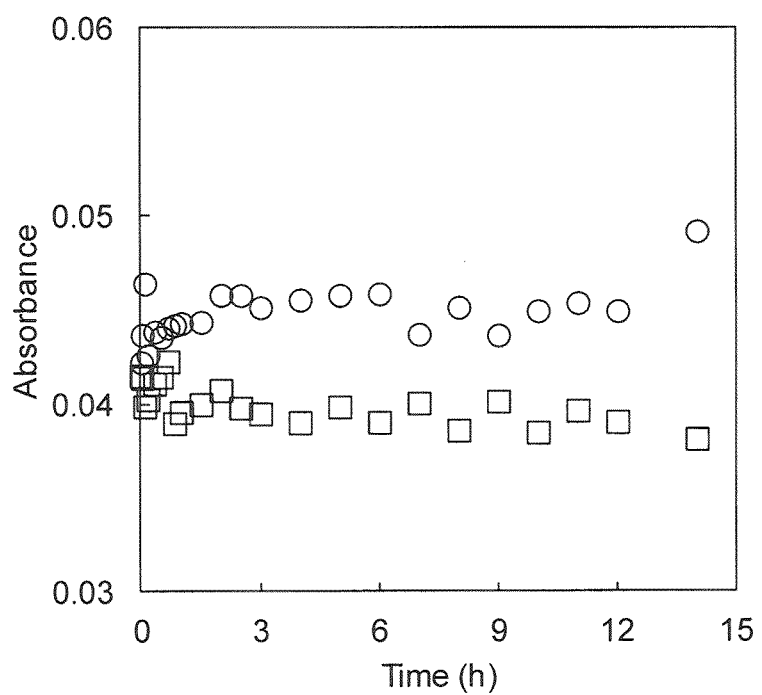
FIG. 9 is a turbidity study graph showing the absorbance of 2.7 nm radius zwitterated iron oxide nanoparticles at λ=700 nm and 37° C. in: (□) 10 mM PBS (140 mM NaCl, pH 7.4), and (○) 50% v/v FBS in PBS. Nanoparticle concentration is 0.1% w/v.
Figure 10:
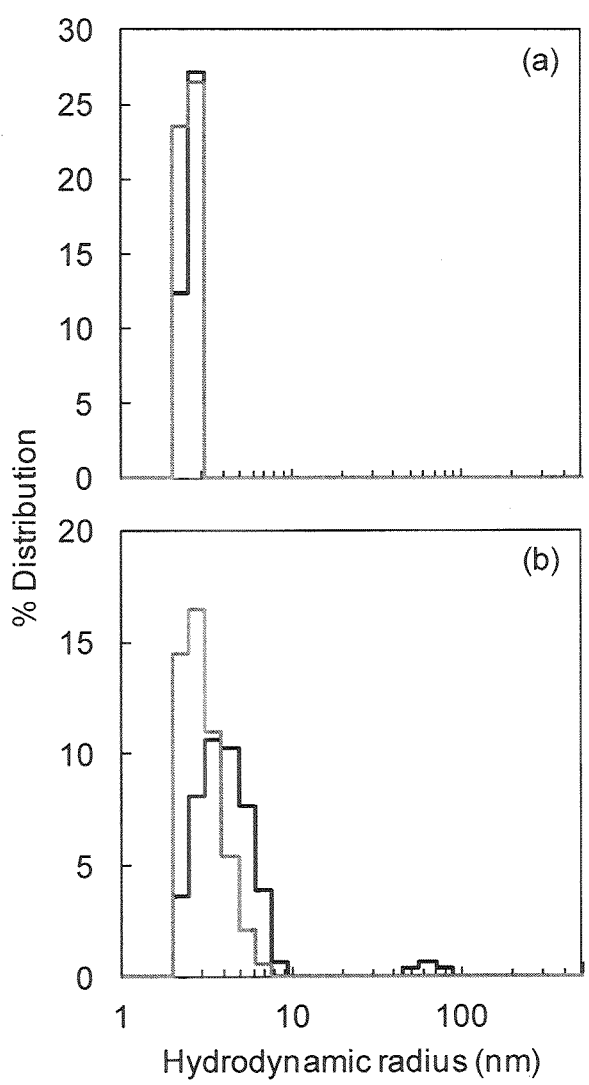
FIG. 10 is two graphs of DLS intensity distribution (black) and number distribution (grey) of 4 nm zwitterated iron oxide nanoparticles, wherein the (a) graph is before and the (b) graph is after incubation with 1% w/v BSA at 37° C. for 3 hours. Nanoparticle concentration was 0.1% w/v in 10 mM PBS (140 mM NaCl, pH 7.4).

The stability of the zwitterated iron oxide nanoparticles was tested in 10 mM PBS (140 mM NaCl, pH 7.4) and in 50% v/v FBS. FIG. 9 shows the turbidimetry results of 2.7 nm radius particles. No increase in absorbance was measured over 15 hours indicating the absence of aggregation. Iron oxide is reported to have an isoelectric point at a pH of about 7 making them unstable in neutral pH liquids. The presence of the zwitterion on the surface of the nanoparticles apparently masks the surface hydroxides, reducing or eliminating surface charge and imparting stability in buffer. Similar behavior was observed in FBS indicating the stability of these particles in bio-mimetic environment even at elevated serum concentration. This behavior is further elucidated by DLS: 0.1% w/v of 4 nm radius zwitterated iron oxide nanoparticles (chosen to closely match the hydrodynamic radius of the protein) were incubated with 1% w/v BSA in PBS at 37° C. for 3 hours. FIG. 10 shows the DLS intensity distribution and number distribution of the incubated nanoparticles. No aggregates were observed after incubation.

Example 11

Incorporation of Amine Surface Functionality

Figure 11:
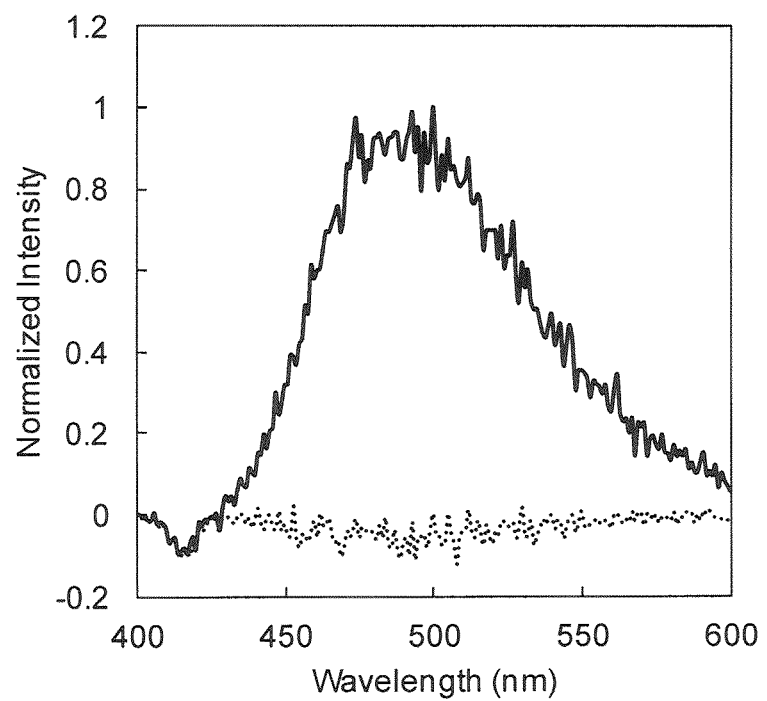
FIG. 11 is a graph of fluorescence test data for the presence of amine on the surface of zwitterated iron oxide nanoparticles. Nanoparticles were dispersed in 20 mM borate buffer (pH 9.0) at a final Fe concentration of 300 microM and reacted with 100 microliters of 3 mg mL$^{-1}$ fluorescamine in DMSO. The solid line is the data for 4 nm zwitterated iron oxide nanoparticles treated with APTES and the dashed line is the data for 4 nm zwitterated iron oxide nanoparticles (control sample).

In situ zwitterated samples were reacted with APTES as in Example 3, and the availability of the amine groups was tested with fluorescence using fluorescamine. Fluorescamine is known to selectively interact with primary amines. As can be seen in FIG. 11, a fluorescence signal is observed for particles treated with APTES in contrast to the control. Furthermore, the size of the particles remained unchanged after APTES addition thus conserving the initial properties of the material.

Having illustrated and described the principles of the present invention, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of preparing a dispersion of stabilized iron oxide nanoparticles that comprise cores, which comprise at least one oxide of iron, and coatings on the cores, which comprise zwitterionic functional groups chemically bound to the cores, the method comprising precipitating at least one oxide of iron from a solution that comprises:
   (a) dissolved ions comprising iron;
   (b) a zwitterion silane, a hydrolyzed product of the zwitterion silane, or a combination thereof, wherein the zwitterion silane comprises a zwitterionic functional group; and
   (c) a solvent;
to form the cores and the coatings and thereby the dispersion of stabilized iron oxide nanoparticles.

2. The method of claim 1, wherein the precipitating comprises adjusting the pH of the solution.

3. The method of claim 1, wherein the at least one oxide of iron is selected from the group consisting of $Fe_2O_3$, $Fe_3O_4$, and combinations thereof.

4. The method of claim 1, wherein the cores consist essentially of the at least one oxide of iron.

5. A method as set forth in claim 1, wherein the solution and the resulting nanoparticles further comprise a fluorescent group, a radioactive nuclide, an additional magnetic material, a neutron capture agent, or a combination thereof.

6. A method as set forth in claim 5, wherein:
   the radioactive nuclide is selected from the group consisting of $^{99m}Tc$, $^{111}Ag$, $^{199}Au$, $^{67}Cu$, $^{64}Cu$, $^{165}Dy$, $^{166}Dy$, $^{69}Er$, $^{166}Ho$, $^{111}In$, $^{177}Lu$, $^{140}La$, $^{32}P$, $^{103}Pd$, $^{149}Pm$, $^{193}Pt$, $^{195}Pt$, $^{186}Re$, $^{188}Re$, $^{105}Rh$, $^{90}Sr$, $^{153}Sm$, $^{175}Yb$, $^{90}Y$, and combinations thereof;
   the additional magnetic material comprises an element selected from the group consisting of aluminum, cerium (IV), chromium(III), cobalt(II), copper(II), dysprosium, erbium, gadolinium, holmium, manganese(II), nickel (II), neodymium, praseodymium(III), samarium(III), ytterbium(III), terbium(III), titanium(IV), yttrium, zirconium, and combinations thereof; and
   the neutron capture agent is $^{157}Gd$.

7. The method of claim 1, wherein the average size of the nanoparticles is less than about 100 nm.

8. The method of claim 1, wherein the average size of the nanoparticles is less than about 10 nm and the coatings have an average thickness that is less than about 5 nm.

9. The method of claim 1, wherein the average size of the nanoparticles is less than about 6 nm and the coatings have an average thickness that is less than about 2 nm.

10. The method of claim 1, wherein the solution has a molar ratio of iron ions to zwitterion silane that is between 0.2 and 5.

11. The method of claim 1, wherein the solution has a molar ratio of iron ions to zwitterion silane that is between 0.5 and 2.

12. The method of claim 1, wherein the solution further comprises one or more compounds selected from the group consisting of polymers, oxidizing agents, chelating agents, surfactants, buffers, passivating agents, viscosity modifiers, wetting agents, stopping compounds, and lubricants.

13. The method of claim 1, wherein the zwitterionic functional groups are pH-independent, pH-dependent, or both.

14. The method of claim 13, wherein:
   the pH-independent zwitterionic functional groups are selected from the group consisting of N,N-dimethyl-N-acryloyloxyethyl-N-(3-sulfopropyl)-ammonium betaine; N,N-dimethyl-N-acrylamidopropyl N-(3-sulfopropyl)-ammonium betaine; 2-(methylthio)ethyl methacryloyl-S-(sulfopropyl)-sulfonium betaine; 2-[(2-acryloylethyl)dimethylammonio]ethyl 2-methyl phosphate; 2-(acryloyloxyethyl)-2'-(trimethylammonium) ethyl phosphate; 2-methacryloyloxyethyl phosphorylcholine (MPC); 2-[(3-acrylamidopropyl) dimethylammonio]ethyl 2'-isopropyl phosphate (AAPI); 1-vinyl-3-(3-sulfopropyl)imidazolium betaine; 1-(3-sulfopropyl)-2-vinylpyridinium betaine; N-(4-sulfobutyl)-N methyl-N,N-diallylamine ammonium betaine (MDABS); N,N-diallyl-N-methyl-N-(2-sulfoethyl)ammonium betaine; N,N-dimethyl-N-(3-methacrylamidopropyl)-N-(3-sulfopropyl) ammonium betaine; N,N-dimethyl-N-acryloyloxyethyl-N-(3-sulfopropyl)-ammonium betaine; N,N-dimethyl-N-methacryloyloxyethyl-N-(3-sulfopropyl)-ammonium betaine; and N,N-dimethyl-N-(3-methacrylamidopropyl)-N-(3-sulfopropyl)ammonium betaine; and
   the pH-dependent zwitterionic functional groups are selected from the group consisting of N,N-dimethyl-N-acrylamidopropyl-N-(2-carboxymethyl)ammonium betaine; [(2-acryloylethyl)dimethylammonio]methyl phosphonic acid; (2-acryloxyethyl)carboxymethylmethylsulfonium chloride; and carboxybetaines.

15. The method of claim 1, wherein the zwitterionic functional groups are selected from the group consisting of sulfobetaines, phosphatidylcholines, and combinations thereof.

16. The method of claim 15, wherein the sulfobetaines have the formula

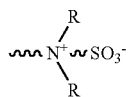

wherein R is aliphatic of length 1 to about 18 carbons, pyrrolidine, piperidine or a derivative of phenylamine.

17. The method of claim 1, wherein the zwitterionic functional groups are chemically bound to the core via silane groups having the formula

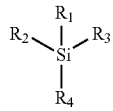

wherein $R_1$, $R_2$, $R_3$ and $R_4$ are independently selected from the group consisting of alkyl, aryl, alkoxy, aryloxy, alkylether, arylether, alkylester, arylester, amidoalkane; wherein at least one of $R_1$, $R_2$, $R_3$, and $R_4$ comprises a zwitterion group; and wherein at least one of $R_1$, $R_2$, $R_3$, and $R_4$ comprises —O—.

18. The method of claim 1, wherein the zwitterion silane is a monomeric zwitterion alkoxysilane.

19. The method of claim 1, wherein the zwitterion silane is a monomeric zwitterion alkoxysilane having the formula

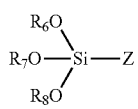

wherein $R_6$, $R_7$ and $R_8$ are alkyl groups of the formula —$C_rH_{2r+1}$ wherein r is from 1 to about 18 and Z is a zwitterion group.

20. The method of claim 19, wherein Z has the formula

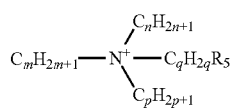

wherein m, n, p, q are 1 to about 18 and $R_5=SO_3^-$, $PO_4^-$, or $COO^-$.

21. The method of claim 20, wherein Z is ammonium betaine.

22. The method of claim 1, wherein the zwitterion silane is 3-(dimethyl(3-(trimethoxysilyl)propyl)ammonio)propane-1-sulfonate.

23. The method of claim 1, wherein the zwitterionic functional groups are selected from the group consisting of the following:

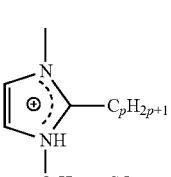
Sulfoalkyl imidazolium salts

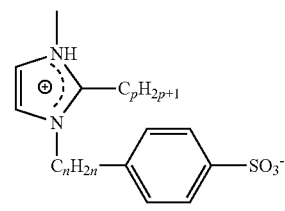
Sulfoaryl imidazolium salts

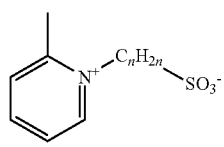
Sulfoalkyl pyridinium salts

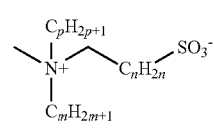
Sulfoalkyl ammonium salts (sulfobetaine)

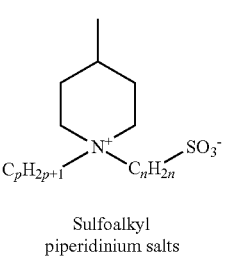
Sulfoalkyl piperidinium salts

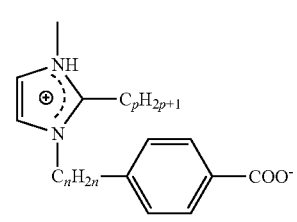
Carboxyaryl imidazolium salts

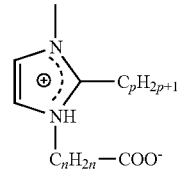
Carboxyalkyl imidazolium salts

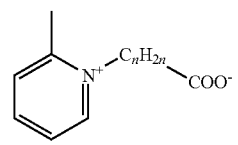
Carboxyalkyl pyridinium salts

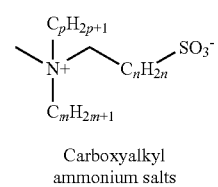
Carboxyalkyl ammonium salts

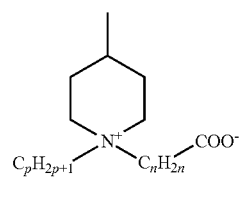
Carboxyalkyl piperidinium salts

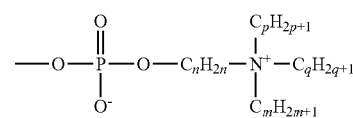
Phosphatidylcholine analogues

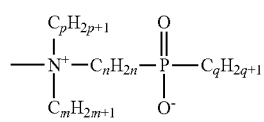
Ammonium phosphonate salts

-continued

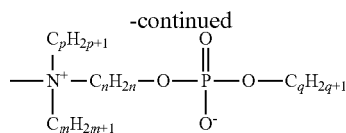

Ammonium phosphonate salts and combinations thereof wherein m, n, p, and q are each from 1 to about 18.

24. A method of preparing a dispersion of stabilized iron oxide nanoparticles that comprise cores, which comprise at least one oxide of iron, and coatings on the cores, which comprise zwitterionic functional groups chemically bound to the cores, the method comprising adjusting the pH of a solution that comprises:
  (a) dissolved iron ions selected from the group consisting of $Fe^{+2}$, $Fe^{+3}$, and combinations thereof;
  (b) a zwitterion alkoxysilane, a hydrolyzed product of the zwitterion alkoxysilane, or a combination thereof, wherein the zwitterion alkoxysilane comprises a zwitterionic functional group;
  (c) a solvent that comprises water; and
  (d) a molar ratio of iron ions to zwitterion alkoxysilane that is between 0.2 and 5;
to precipitate the at least one oxide or iron from the solution and form the cores and the coatings and thereby the dispersion of stabilized iron oxide nanoparticles;
  wherein the stabilized iron oxide nanoparticles have an average size that is less than about 10 nm and the coatings have an average thickness that is less than about 5 nm;
  wherein the at least one oxide of iron is selected from the group consisting of $Fe_2O_3$, $Fe_3O_4$, and combinations thereof;
  wherein the zwitterionic functional groups are chemically bound to the cores via silane groups having the formula

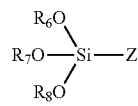

wherein $R_6$, $R_7$ and $R_8$ are alkyl groups of the formula —$C_rH_{2r+1}$ wherein r is from 1 to about 18 and Z is a zwitterion group having the formula

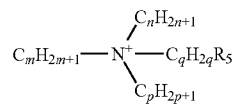

wherein m, n, p, q are 1 to about 18 and $R_5=SO_3^-$, $PO_4^-$, or $COO^-$.

25. The method of claim 24, wherein the solution has a molar ratio of iron ions to zwitterion alkoxysilane that is between 0.5 and 2, and wherein the average size of the nanoparticles is less than about 6 nm and the coatings have an average thickness that is less than about 2 nm, and wherein m, n, p, q, and r are from 1 to 6, and wherein $R_5$ is $SO_3^-$.

* * * * *